United States Patent
Kilzer et al.

(10) Patent No.: US 8,028,123 B2
(45) Date of Patent: *Sep. 27, 2011

(54) CIRCULAR WEAR LEVELING

(75) Inventors: Kevin L. Kilzer, Chandler, AZ (US);
Robert W. Ellis, Phoenix, AZ (US);
Rudolph J. Sterbenz, Chandler, AZ (US)

(73) Assignee: SMART Modular Technologies (AZ), Inc., Phoenix, AZ (US)

( * ) Notice: Subject to any disclaimer, the term of this patent is extended or adjusted under 35 U.S.C. 154(b) by 654 days.

This patent is subject to a terminal disclaimer.

(21) Appl. No.: 12/103,277

(22) Filed: Apr. 15, 2008

(65) Prior Publication Data

US 2009/0259801 A1     Oct. 15, 2009

(51) Int. Cl.
*G06F 12/00* (2006.01)

(52) U.S. Cl. .................... 711/103; 711/110

(58) Field of Classification Search .......... 711/103
See application file for complete search history.

(56) References Cited

U.S. PATENT DOCUMENTS

| | | | |
|---|---|---|---|
| 5,930,504 A | 7/1999 | Gabel | |
| 5,963,983 A | 10/1999 | Sakakura et al. | |
| 6,412,080 B1 | 6/2002 | Fleming et al. | |
| 7,107,389 B2 | 9/2006 | Inagaki et al. | |
| 7,139,864 B2 | 11/2006 | Bennett et al. | |
| 7,330,927 B1 | 2/2008 | Reeve et al. | |
| 2003/0163633 A1 | 8/2003 | Aasheim et al. | |
| 2005/0021904 A1 | 1/2005 | Iaculo et al. | |
| 2005/0038792 A1 | 2/2005 | Johnson | |
| 2006/0020745 A1 | 1/2006 | Conley et al. | |
| 2006/0069852 A1 | 3/2006 | Aasheim et al. | |
| 2006/0101219 A1 | 5/2006 | Mita et al. | |
| 2006/0106749 A1* | 5/2006 | Ganfield et al. | 707/1 |
| 2006/0136682 A1 | 6/2006 | Haridas et al. | |
| 2006/0143365 A1 | 6/2006 | Kikuchi | |
| 2006/0224823 A1 | 10/2006 | Morley et al. | |
| 2006/0256624 A1 | 11/2006 | Eggleston et al. | |
| 2006/0282644 A1 | 12/2006 | Wong | |
| 2007/0005928 A1* | 1/2007 | Trika et al. | 711/202 |
| 2007/0033374 A1 | 2/2007 | Sinclair et al. | |
| 2007/0198796 A1* | 8/2007 | Warren, Jr. | 711/165 |
| 2007/0234004 A1 | 10/2007 | Oshima et al. | |
| 2007/0276973 A1 | 11/2007 | Tan et al. | |
| 2007/0283428 A1 | 12/2007 | Ma et al. | |
| 2008/0046630 A1 | 2/2008 | Lasser | |
| 2008/0077762 A1* | 3/2008 | Scott et al. | 711/170 |
| 2008/0133832 A1* | 6/2008 | Bhavnani | 711/115 |
| 2008/0195822 A1 | 8/2008 | Yang et al. | |

(Continued)

OTHER PUBLICATIONS

ISR and WO dated Nov. 26, 2009 for International Application No. PCT/US2009/040713.

(Continued)

*Primary Examiner* — Tuan Thai
*Assistant Examiner* — Ngoc Dinh
(74) *Attorney, Agent, or Firm* — Snell & Wilmer L.L.P.

(57) ABSTRACT

A method for flash memory management comprises providing a head pointer configured to define a first location in a flash memory, and a tail pointer configured to define a second location in a flash memory. The head pointer and tail pointer define a payload data area. Payload data is received from a host, and written to the flash memory in the order it was received. The head pointer and tail pointer are updated such that the payload data area moves in a circular manner within the flash memory.

15 Claims, 10 Drawing Sheets

U.S. PATENT DOCUMENTS

2009/0164702 A1* 6/2009 Kern .............................. 711/103
2010/0077136 A1* 3/2010 Ware et al. .................... 711/103

OTHER PUBLICATIONS

ISR and WO dated Dec. 1, 2009 for International Application No. PCT/US2009/040714.
ISR and WO dated Dec. 1, 2009 for International Application No. PCT/US2009/040715.
IPRP dated Sep. 14, 2010 for International Application No. PCT/US2009/040713.
IPRP dated Sep. 14, 2010 for International Application No. PCT/US2009/040714.
IPRP dated Sep. 14, 2010 for International Application No. PCT/US2009/040715.
Office Action dated Oct. 21, 2010 for U.S. Appl. No. 12/103,273.
Final Office Action dated May 25, 2011 for U.S. Appl. No. 12/103,273, 14 pages.
Non Final Office Action dated May 26, 2011 for U.S. Appl. No. 12/424,466, 17 pages.

* cited by examiner

CIRCULAR WEAR LEVELING

TECHNICAL FIELD

The present disclosure relates to information storage, particularly storage in flash memory systems and devices.

BACKGROUND

Flash memory is a storage medium which may be erased and written electronically. It is non-volatile, and therefore maintains the information contained within it without the need for power. It typically offers improved resistance to kinetic damage compared to other storage technologies, such as magnetic disks and tapes. However, the number of write and/or erase cycles which may be performed on any particular block of flash memory is finite. Because a flash memory device holds many individual memory blocks, write and/or erase cycles are often distributed across the entire memory array in order to extend the functional lifetime of each memory block.

Techniques for distributing write and/or erase cycles across a flash memory array are commonly known as wear leveling. Nevertheless, despite the existence of various such wear leveling techniques, it remains desirable to further improve the performance of flash memory in order to realize benefits such as improved read speeds, improved write speeds, and increased flash memory functional lifetime.

SUMMARY

This disclosure relates to flash memory management using a circular writing approach. In particular, a circular writing approach is configured to provide both a flash filing system and wear leveling. In an exemplary embodiment, a head pointer defines a first location in a flash memory. A tail pointer defines a second location in the flash memory, and the head pointer and tail pointer define the beginning and end of a payload data area. Payload data is received from a host, and written at the head pointer location in the order the payload data was received. The head pointer and tail pointer are updated so that the payload data area moves in a circular manner within the flash memory.

In another exemplary embodiment, data is managed on a flash memory device by defining a circular storage space comprised of erase blocks. Payload data is received from a host, and written in the order it was received to erase blocks in the circular storage space.

In yet another exemplary embodiment, a solid state drive is provided. The drive comprises a flash memory controller configured to receive payload data from a host, and a flash chip configured as a circular storage space. The flash memory controller is configured to write payload data to the flash chip in the order it was received from the host.

In still another exemplary embodiment, a data storage system is provided. The system comprises a flash memory configured as a circular storage space, and a flash controller coupled to the flash memory. The flash controller is configured to write incoming data to the flash memory in the order the data is received.

BRIEF DESCRIPTION OF THE DRAWINGS

With reference to the following description, appended claims, and accompanying drawings:

DETAILED DESCRIPTION

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from the scope of the appended claims.

For the sake of brevity, conventional techniques for flash management may not be described in detail herein. Furthermore, the connecting lines shown in various figures contained herein are intended to represent exemplary functional relationships and/or physical couplings between various elements. It should be noted that many alternative or additional functional relationships or physical connections may be present in a practical flash memory management system.

For purposes of convenience, the following definitions may be used in this disclosure:

A page is a logical unit of flash memory.

An erase block is a logical unit of flash memory containing multiple pages.

Payload data is data stored and/or retrieved by a host, such as a host computer or other external data source.

Wear leveling is a process by which locations in flash memory are utilized such that the entire flash memory ages substantially uniformly, reducing localized overuse and associated failure of individual, isolated locations.

Metadata is data related to a portion of payload data (such as one page), which may provide identification information, support information, or other information to assist in managing payload data, such as to assist in determining the position of payload data within the storage context as understood by a host computer.

Prior flash memory management schemes often assume that pages within an erase block can be written in any order, and so allow payload data to be deposited non-sequentially. This simplifies the task of locating a specific block for retrieval by placing the blocks into a predefined order that allows addresses to be calculated using numerical methods instead of tabular methods, and has no bearing on the order in which blocks arrive from the host. These prior flash memory management schemes would sometimes additionally implement wear leveling techniques in order to increase the lifetime of a flash memory device. However, such flash memory management schemes often perform poorly when writing data that is substantially unsorted, fragmented, or otherwise disjoint ("random writes"). In these schemes, random write performance may be as much as two orders of magnitude slower than performance when writing substantially sorted, related, or contiguous data ("sequential writes"). In transaction-based computing systems and other high-load applications, data often comprises highly fragmented and/or random portions, rather than large, contiguous portions. As such, prior flash memory management schemes offer unsuitable performance for use in these areas, because the vast majority of write operations are random writes.

In contrast, in accordance with an exemplary aspect of the present invention, flash memory management is improved by writing payload data to a particular flash memory device in the order in which it was received, and/or in sequential order within an erase block. Thus, in essence, sequences of random data are written in the same manner as sequences of contiguous data. Such an approach can vastly improve random write performance, with minimal impact on sequential write performance. A flash memory device, such as a solid state drive, configured to achieve improved random write performance can better suit the needs of, for example, applications in the small block size enterprise storage market, such as database and database-like programs, and other applications which make frequent, small accesses to data storage.

By writing incoming payload data in the order in which it was received, the time order of the incoming payload data is preserved. Further, such an approach can eliminate position dependence of payload data within an erase block. Stated another way, because incoming payload data is written in the order it was received, there may be no ordinal relationship among pages of payload data stored within an erase block. In particular, payload data stored within an erase block may be entirely disjoint, with each page of payload data having no relationship to any other page of payload data.

Further, certain modern flash memory devices (for example, Intel SD58 series NAND flash memory) impose the restriction that pages within an erase block must be written in sequential order. However, prior flash memory management systems comprising these flash memory devices did not write incoming data directly to the flash memory device in the order in which it was received. Rather, these prior systems may have held incoming data in a buffer until a fall erase block of related data was received, and then wrote the entire erase block of related data to the flash memory device at once (i.e., these prior systems wrote sequences of contiguous data differently than sequences of random data). When operating within the constraints presented by such devices, and in accordance with an exemplary aspect of the present invention, a flash memory management system realizes improvements in data integrity by writing sequences of random data in the same manner as sequences of contiguous data. However, the principles of the present invention may be applied to all flash memory, and are not limited to flash memory which imposes the restriction that pages within an erase block must be written in sequential order. Additionally, the principles of the present invention may be applied to any storage technology which requires data to be erased on a blockwise basis.

With reference to FIG. 1, FIG. 2, FIG. 3A, FIG. 3B, and FIG. 4, in accordance with an exemplary embodiment, a flash memory management system comprises a solid state drive 102. Solid state drive 102 may be coupled to a host computer 108. Solid state drive 102 comprises a flash chip array 110 and a flash chip controller 104. Flash chips 106 in flash chip array 110 are divided into erase blocks 312, and erase blocks 312 are divided into pages 314. One or more data structures, such as data tables 408, to support solid state drive 102 are constructed in RAM 402 of sequence and control machine 210.

Returning now to FIG. 1, in accordance with an exemplary embodiment, a solid state drive 102 is a storage medium capable of storing electronic information in a persistent form, typically in computer chips or other solid-state devices. In an exemplary embodiment, solid state drive 102 comprises a thumb drive. In other exemplary embodiments, solid state drive 102 comprises a storage medium in a desktop computer, a laptop computer, a smartphone, or a personal digital assistant. Solid state drive 102 can be used in place of magnetic disk drives or certain other magnetic, optical, or electronic storage components in computing systems. Solid state drive 102 can provide significant advantages when compared to magnetic or optical storage, such as faster seek times, faster access times, improved ruggedness and reliability, lower operating noise, and lower power consumption. Depending on the configuration and components of a particular solid state drive 102, it may be compatible with computer storage interface protocols, including but not limited to Serial Advanced Technology Attachment (SATA), Parallel Advanced Technology Attachment (PATA), Small Computer System Interface (SCSI), IEEE 1394 (Firewire), Serial Attached SCSI (SAS), Fibre Channel (FC), and Universal Serial Bus (USB). Further, solid state drive 102 may be configured to conform with standard storage form factors, such as "5.25 inch", "3.5 inch" (commonly used in desktop storage products), and "2.5 inch" (commonly used in mobile computing products).

Figure 1:
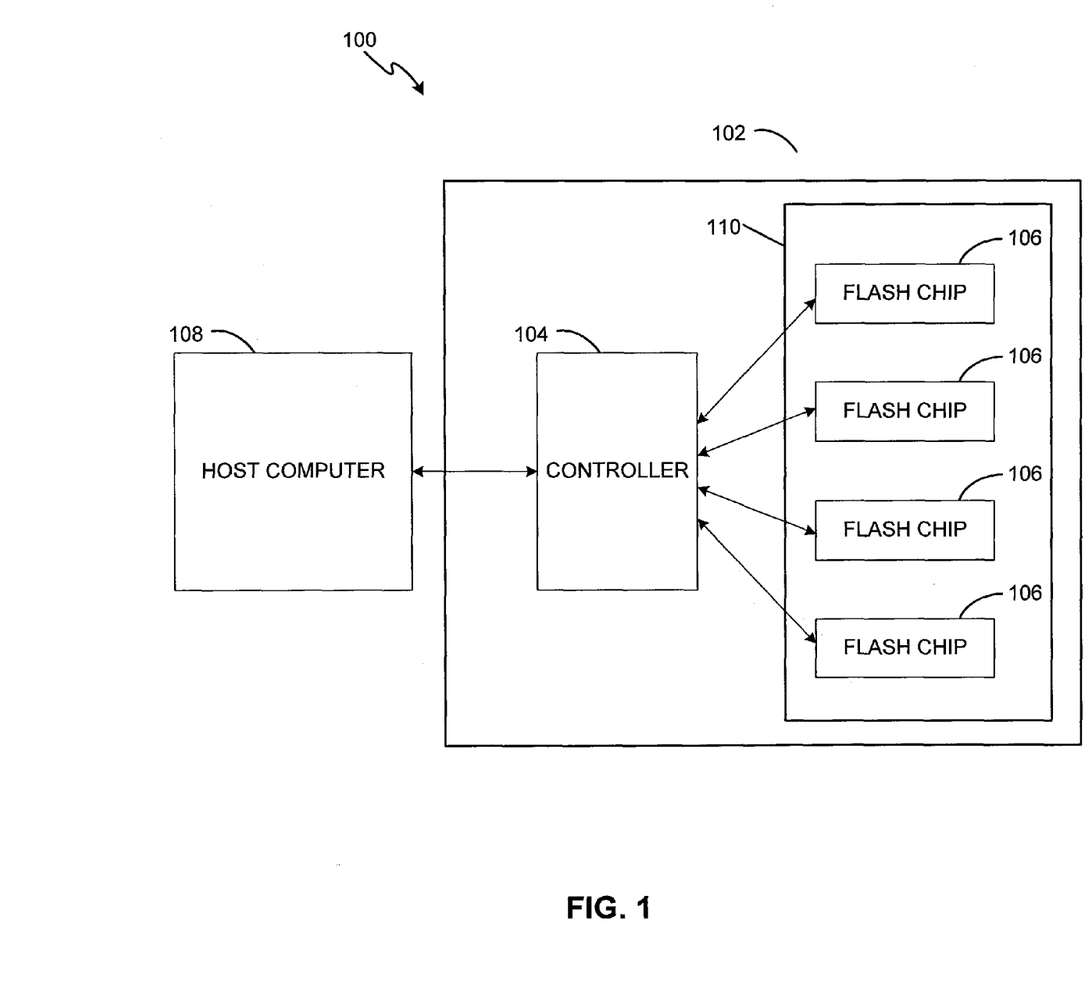
FIG. 1 represents a solid state drive and host computer system in accordance with an exemplary embodiment of the invention.

A flash chip array, such as flash chip array 110, comprises one or more flash chips 106. Any number of flash chips may be selected. In one exemplary embodiment, a flash chip array 110 comprises sixteen flash chips. In various exemplary embodiments, other suitable numbers of flash chips 106 may be selected, such as one, two, four, eight, or thirty-two flash chips. Flash chips 106 may be selected to meet storage size, power draw, or other desired flash chip array characteristics.

In an exemplary embodiment, flash chip array 110 comprises flash chips 106 having similar storage sizes. In various other exemplary embodiments, flash chip array 110 comprises flash chips 106 having different storage sizes. Any number of flash chips 106 having various storage sizes may be selected. Further, a number of flash chips 106 having a significant number of unusable erase blocks 312 may comprise flash chip array 110. In this manner, one or more flash chips 106 which may have been unsuitable for use in a particular solid state drive 102 can now be utilized. For example, a particular flash chip 106 may contain 2 gigabytes of storage capacity. However, due to manufacturing processes or other factors, 1 gigabyte of the storage capacity on this particular flash chip 106 may be unreliable or otherwise unusable. Similarly, another flash chip 106 may contain 4 gigabytes of storage capacity, of which 512 megabytes are unusable. These two flash chips 106 may be included in a flash chip array 110, and the total storage capacity of flash chip array 110 may be reported as 4 gigabytes.

Thus, in an exemplary embodiment, the reported storage capacity of flash chip array 110 may be smaller than the actual storage capacity, for such reasons as to compensate for the development of bad blocks, provide space for defragmentation operations, provide space for index information, extend the useable lifetime of flash chip array 110, and the like. For example, flash chip array 110 may comprise flash chips 106 having a total useable storage capacity of 10 gigabytes. However, the reported capacity of flash chip array 110 may be 2 gigabytes. Thus, individual memory elements in flash chip array 110 may be utilized in a reduced manner, and the useable lifetime of flash chip array 110 may be extended. In the present example, the useable lifetime of flash chip array 110 would be about five times longer than the useable lifetime of a flash chip array 110 containing only 2 gigabytes of total useable storage capacity.

Flash chips 106 may be mounted on a printed circuit board. Flash chips 106 may also be mounted in other suitable configurations in order to facilitate their use in forming flash chip array 110.

In an exemplary embodiment, flash chip array 110 is configured to interface with flash controller 104. Flash controller 104 is configured to facilitate reading, writing, erasing, and other operations on flash chips 106. Flash controller 104 may be configured in any suitable manner to facilitate operations on flash chips 106 in flash chip array 110.

In flash chip array 110, and according to an exemplary embodiment, individual flash chips 106 are configured to receive a chip select (CS) signal. A CS signal is configured to locate, address, and/or activate a flash chip 106. For example, in a flash chip array 110 with eight flash chips 106, a three-bit binary CS signal would be sufficient to uniquely identify each individual flash chip 106. In an exemplary embodiment, CS signals are sent to flash chips 106 from flash controller 104. In another exemplary embodiment, discrete CS signals are decoded within flash controller 104 from a three-bit CS value and applied individually to each of the flash chips 106.

In an exemplary embodiment, multiple flash chips 106 in flash chip array 110 may be accessed simultaneously. Simultaneous access can facilitate performance gains, such as improvements in responsiveness and throughput of flash chip array 110.

A flash chip, such as flash chip 106, may be an integrated circuit fabricated on a single piece of silicon or other suitable substrate. Alternatively, flash chip 106 may comprise integrated circuits fabricated on multiple substrates. One or more flash chips 106 may be packaged together in a standard package such as a thin small outline package, ball grid array, stacked package, land grid array, quad flat package, or other suitable package, such as standard packages approved by the Joint Electron Device Engineering Council (JEDEC). A flash chip 106 may also conform to specifications promulgated by the Open NAND Flash Interface Working Group (OFNI). A flash chip 106 can be fabricated and packaged in any suitable manner for inclusion in a flash chip array 110.

Flash chip 106 may contain any number of non-volatile memory elements, such as NAND flash elements, NOR flash elements, and the like. Flash chip 106 may also contain control circuitry. Control circuitry can facilitate reading, writing, erasing, and other operations on non-volatile memory elements. Such control circuitry may comprise elements such as microprocessors, registers, buffers, counters, timers, error correction circuitry, and input/output circuitry. Such control circuitry may also be located external to flash chip 106.

Figure 3A:
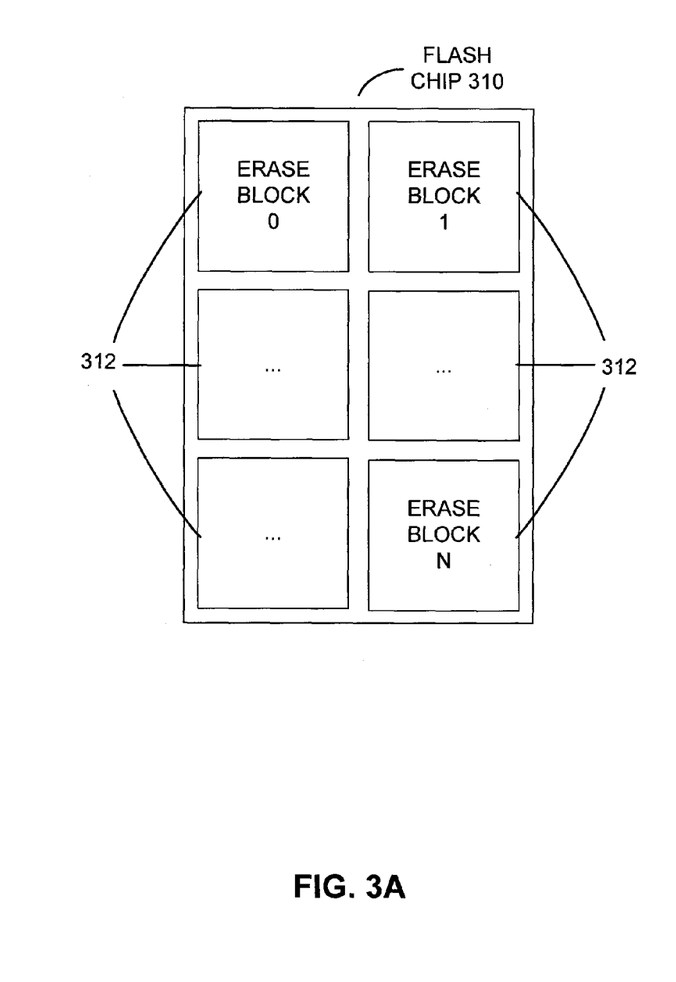
FIG. 3A represents a flash chip containing erase blocks in accordance with an exemplary embodiment of the invention.
Figure 3B:
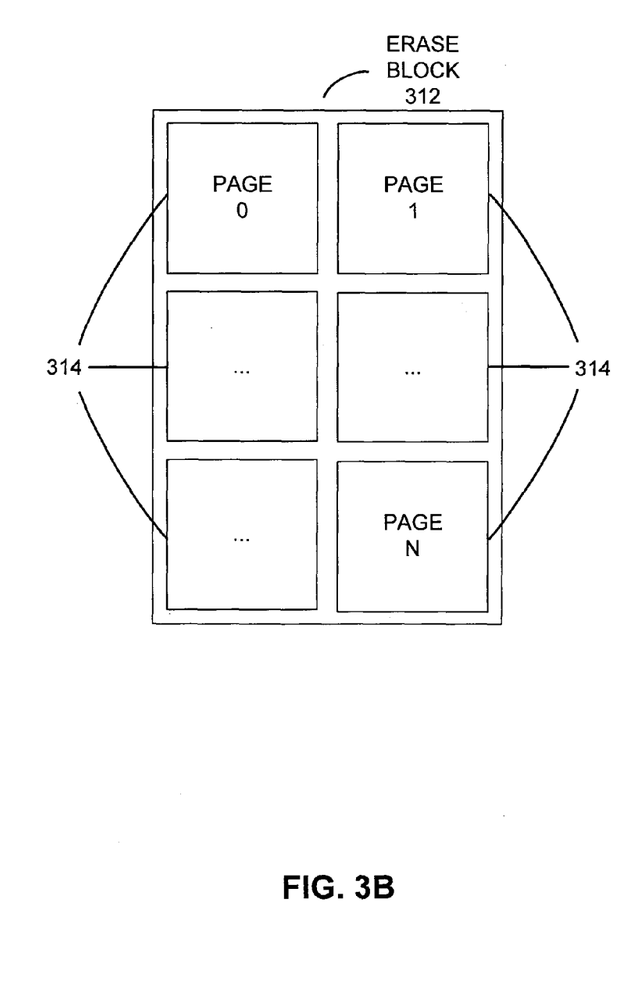
FIG. 3B represents an erase block containing pages in accordance with an exemplary embodiment of the invention.

In an exemplary embodiment, non-volatile memory elements on flash chip 106 are configured as a number of erase blocks 0 to N. With reference to FIG. 3A and FIG. 3B, a flash chip 106, such as flash chip 310, comprises one or more erase blocks 312. Each erase block 312 comprises one or more pages 314. Each page 314 comprises a subset of the non-volatile memory elements within an erase block 312. Each erase block 312 contains about 1/N of the non-volatile memory elements located on flash chip 310.

In general, because flash memory, particularly NAND flash memory, may often be erased only in certain discrete sizes at a time, flash chip 310 typically contains a large number of erase blocks 312. Such an approach allows operations on a particular erase block 312, such as erase operations, to be conducted without disturbing data located in other erase blocks 312. Alternatively, were flash chip 310 to contain only a small number of erase blocks 312, data to be erased and data to be preserved would be more likely to be located within the same erase block 312. In the extreme example where flash chip 310 contains only a single erase block 312, any erase operation on any data contained in flash chip 310 would require erasing the entire flash chip 310. If any data on flash chip 310 was desired to be preserved, that data would need to be read out before the erase operation, stored in a temporary location, and then re-written to flash chip 310. Such an approach has significant overhead, and could lead to premature failure of the flash memory due to excessive, unnecessary read/write cycles.

With continued reference to FIG. 3A and FIG. 3B, an erase block 312 comprises a subset of the non-volatile memory elements located on flash chip 310. Although memory elements within erase block 312 may be programmed and read in smaller groups, all memory elements within erase block 312 may only be erased together. Each erase block 312 is further subdivided into any suitable number of pages 314. A flash chip array 110 may be configured to comprise flash chips 310 containing any suitable number of pages 314.

A page 314 comprises a subset of the non-volatile memory elements located within an erase block 312. In an exemplary embodiment, there are 64 pages 314 per erase block 312. To form flash chip array 110, flash chips 106 comprising any suitable number of pages 314 per erase block 312 may be selected.

In addition to memory elements used to store payload data, a page 314 may have memory elements configured to store error detection information, error correction information, and/or other information intended to ensure safe and reliable storage of payload data. In an exemplary embodiment, metadata stored in a page 314 is protected by error correction codes. In various exemplary embodiments, a portion of erase block 312 is protected by error correction codes. This portion may be smaller than, equal to, or larger than one page.

In an exemplary embodiment, erase block 312 comprises 64 pages 314. Of these pages, 63 are configured to store payload data, such as data received from an external source, such as host computer 108. The final page is configured to contain erase block index information. Furthermore, any number of pages in erase block 312 may be used to store payload data and/or erase block index information. In an exemplary embodiment, erase block index information stored in the final page comprises a duplicate copy of metadata associated with each page 314 configured to store payload data. Additionally, index information for a particular erase block 312 may be stored in the final page of a different erase block 312. For example, index information for a particular erase block 312 located on a flash chip 106 may be stored in an erase block 312 located on a different flash chip 106. Erase block index information may be stored in any suitable location configured to store index information. Multiple copies of erase block index information for a particular erase block 312 may be stored at various locations in flash chip array 110.

Figure 4:
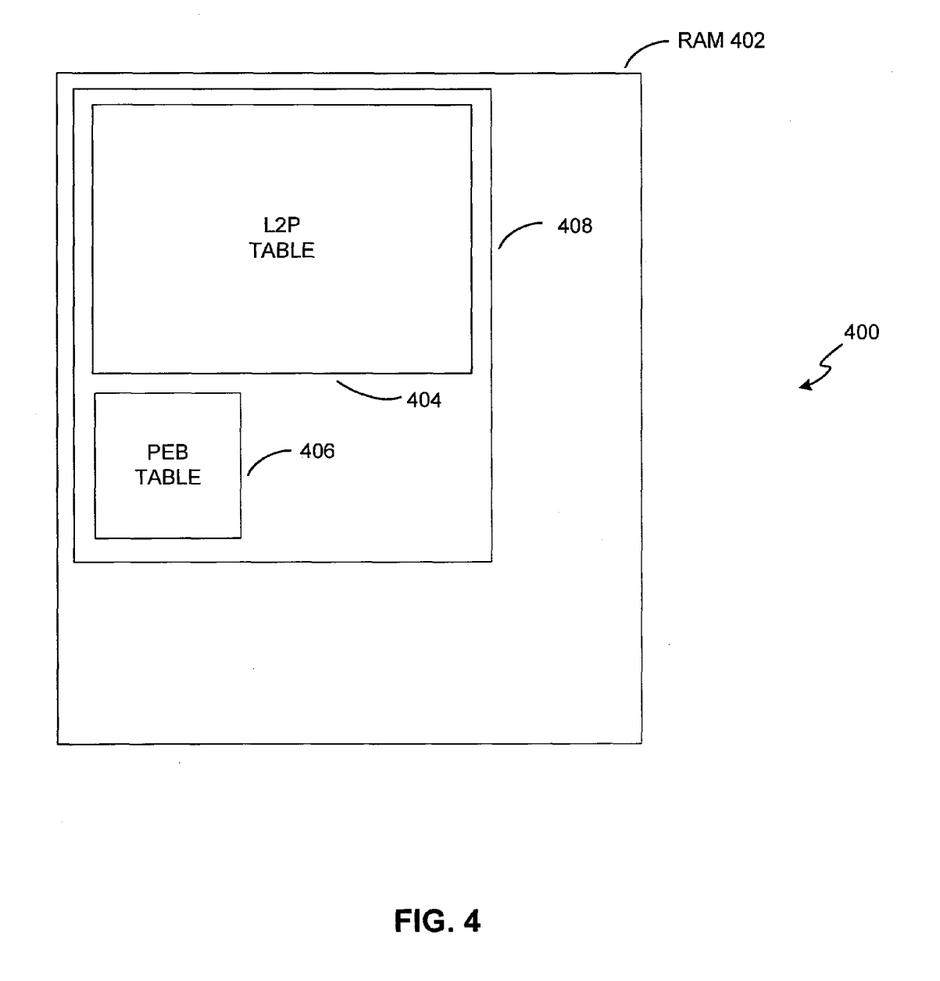
FIG. 4 illustrates data structures in accordance with an exemplary embodiment of the invention.

With reference to FIG. 4 and in an exemplary embodiment, index information is used to construct or reconstruct one or more data structures. For example, an erase block table, such as a physical erase block (PEB) table 406, and/or a page table, such as a logical to physical (L2P) table 404, can be created in RAM 402 in sequence and control machine 210. Index information for an erase block 312 may be constructed, stored, or otherwise held in RAM 402 in sequence and control machine 210. In accordance with an exemplary embodiment, index information for an erase block 312 is written to final page 314 when all other pages 314 within erase block 312 have been filled with payload data. Index information for an erase block 312 may also be written to final page 314 when a write operation to erase block 312 is completed, even though all other pages within erase block 314 may not yet be filled with payload data. Index information for an erase block 312 may be written to final page 314 at any time in order to provide an accurate record of the contents and status of erase block 312.

When an erase block 312 contains no valid payload data, it is ready to be erased. The index information for this erase block 312 may be marked as obsolete. An erase block 312 may be erased at any appropriate time.

Figure 2:
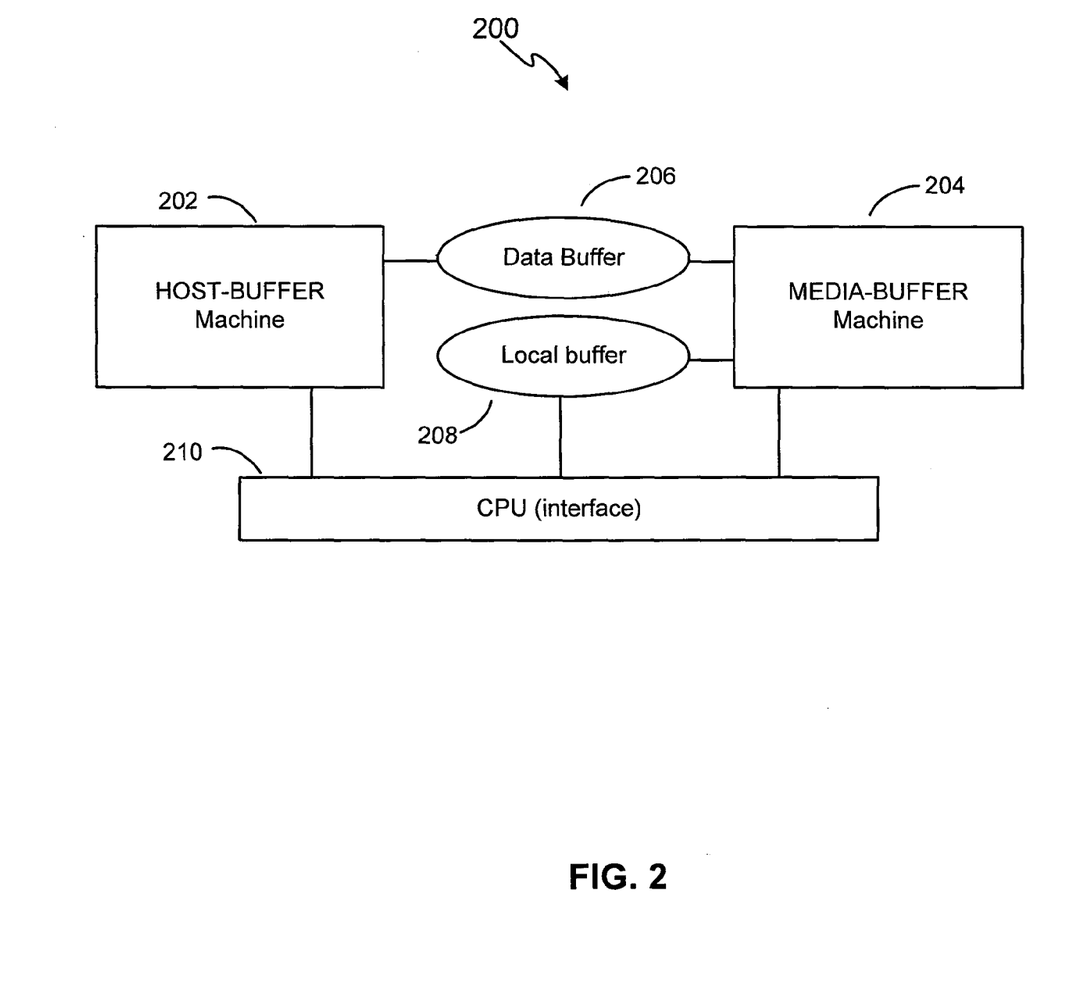
FIG. 2 discloses a flash controller in accordance with an exemplary embodiment of the invention.

Turning now to FIG. 2, a flash controller 104, such as flash controller 200, may comprise any suitable circuitry configured to interface with flash chips 106 and with host computer 108. For example, flash controller 200 may be implemented on a field programmable gate array (FPGA). In another example, flash controller 200 may be implemented on an application specific integrated circuit (ASIC). Further, flash controller 200 may be implemented on any suitable hardware. In accordance with an exemplary embodiment, flash controller 200 comprises a buffer-host machine 202, a media-buffer machine 204, a data buffer 206, a local buffer 208, and a sequence and control machine 210. Flash controller 200 is configured to communicate with host computer 108 and with flash chips 106.

Buffer-host machine 202 may comprise any suitable circuitry configured to provide an interface between data buffer 206 and an external data source, such as host computer 108. In an exemplary embodiment, buffer-host machine 202 is configured to interface with host computer 108. Buffer-host machine 202 is further configured to control the flow of payload data between host computer 108 and data buffer 206. Buffer-host machine 202 is configured to receive and optionally queue commands from host computer 108. Any errors resulting from these commands are returned to host computer 108 on behalf of sequence and control machine 210. In particular, commands that do not involve the transfer of payload data are not applied to sequence and control machine 210, but instead are handled directly by buffer-host machine 202.

In an exemplary embodiment, for a solid state drive 102 configured as an ATA drive replacement, such non-payload commands comprise ATA commands, such as the ATA IDENTIFY and ATA SET FEATURES commands. In an exemplary embodiment, buffer-host machine 202 is configured to have logical block address level visibility into data buffer 206. Such a configuration allows buffer-host machine 202 to reduce latency. Further, it allows buffer-host machine 202 to manage data transfers which are less than one page in size.

Data buffer 206 may comprise any suitable circuitry configured to connect media-buffer machine 204 and buffer-host machine 202. In an exemplary embodiment, data buffer 206 is a page-sized buffer. In other embodiments, data buffer 206 may be larger than one page. Data buffer 206 may be any size suitable to be configured to connect media-buffer machine 204 and buffer-host machine 202. In an exemplary embodiment, data buffer 206 is configured to hold data as a short-time cache (for example, for less-than-page sized operations). In various exemplary embodiments, data buffer 206 is configured as a first-in-first-out (FIFO) buffer. In other exemplary embodiments, data buffer 206 is configured in any suitable manner to connect media-buffer machine 204 and buffer-host machine 202. Further, data buffer 206 may be configured to transfer data between host-buffer machine 202 and media-buffer machine 204.

Media-buffer machine 204 may comprise any suitable circuitry configured to provide an interface between data buffer 206 and flash chip array 110. In an exemplary embodiment, media-buffer machine 204 is configured to communicate with and control one or more flash chips 106. In various exemplary embodiments, media-buffer machine 204 is configured to provide error correction code generation and checking capabilities.

Local buffer 208 is a buffer configured to capture local data. In an exemplary embodiment, local buffer 208 can capture error correction data.

Sequence and control machine 210 may comprise any suitable circuitry configured to receive payload data processing commands from buffer-host machine 202, and configured to implement the logic and computational processes necessary to carry out and respond to these commands. In an exemplary embodiment, sequence and control machine 210 is configured to create, access, and otherwise manage data structures, such as data tables 408. Further, sequence and control machine 210 is configured to coordinate buffer-host machine 202, data buffer 206, local buffer 208, and media-buffer machine 204 in order to implement tasks such as read, write, and garbage collection (as illustrated in exemplary embodiments in FIGS. 5, 6, 7 and 8).

Turning again to FIG. 4, in accordance with an exemplary embodiment, one or more data structures, such as data tables 408, are maintained in random access memory (RAM) of sequence and control machine 210, such as RAM 402. Data tables 408 are configured to facilitate read, write, erase, and other operations on flash chip array 110 in solid state drive 102.

According to an exemplary embodiment, data tables 408 are stored in their entirety in RAM 402 of sequence and control machine 210. No portion of data tables 408 is stored on a hard disk drive, solid state drive, magnetic tape, or other non-volatile medium. Prior approaches were unable to store data tables 408 in their entirety in RAM 402 due to the limited availability of space in RAM 402. But now, large amounts of RAM 402, such as 32 megabytes, 64 megabytes, 128 megabytes, or more, are relatively inexpensive and are now commonly available for use in sequence and control machine 210. Because data tables 408 are stored in their entirety in RAM 402, which may be quickly accessed, system speed can be increased when compared to former approaches which stored only a portion of a data table in RAM 402, and stored the remainder of a data table on a slower, nonvolatile medium. In other exemplary embodiments, portions of data tables 408, such as infrequently accessed portions, are strategically stored in non-volatile memory. Such an approach balances the performance improvements realized by keeping data tables 408 in RAM 402 with the potential need to free up portions of RAM 402 for other uses.

With continued reference to FIG. 4, in an exemplary embodiment, a logical page is mapped to a particular area of physical non-volatile memory on a flash chip 106 by use of a table, such as a logical to physical (L2P) table 404. Entries in L2P table 404 contain physical addresses for logical memory pages. Entries in L2P table 404 may also contain additional information about the page in question. The size of L2P table 404 defines the apparent capacity of solid state drive 102.

L2P table 404 contains information configured to map a logical page to a logical erase block and page. For example, in an exemplary embodiment, in L2P table 404 an entry contains 22 bits: an erase block number (16 bits), and a page offset number (6 bits). With reference to FIG. 3A and FIG. 3B, the erase block number identifies a specific logical erase block 312 in solid state drive 102, and the page offset number identifies a specific page 314 within erase block 312. The number of bits used for the erase block number, and the page offset number may be increased or decreased depending on the number of flash chips 106, erase blocks 312, and/or pages 314 desired to be indexed.

With continued reference to FIG. 3A, FIG. 3B, and FIG. 4, erase blocks 312 in a solid state drive 102 may be managed via a table, such as a physical erase block (PEB) table 406. PEB table 406 may be configured to contain any suitable information about erase blocks 312. In an exemplary embodiment, PEB table 406 contains information configured to locate erase blocks 312 in flash chip array 110.

In an exemplary embodiment, PEB table 406 is located in its entirety in RAM 402 of sequence and control machine 210. Further, PEB table 406 is configured to store information about each erase block 312 in flash chip array 110, such as the flash chip 106 where erase block 312 is located (i.e., a chip select (CS) value); the location of erase block 312 on flash chip 106; the state (e.g., dirty, erased, and the like) of pages 314 in erase block 312; the number of pages 314 in erase block 312 which currently hold payload data; the number of times a head pointer 620 has traversed erase block 312; and the like. Additionally, the size of PEB table 406 may be varied in order to allow tracking and management of operations on portions of erase block 312 smaller than one page in size. Further, pages 314 within erase block 312 may be tracked, such that when a particular page is deemed unusable, the remaining pages in erase block 312 may still be used, rather than marking the entire erase block 312 containing the unusable page as unusable.

In addition to L2P table 404 and PEB table 406, other data structures, such as data tables 408, may be configured to manage the contents of flash chip array 110. In an exemplary embodiment, L2P table 404, PEB table 406, and all other data tables 408 are located in their entirety in RAM 402 of sequence and control machine 210. In other exemplary embodiments, L2P table 404, PEB table 406, and all other data tables 408 are located in any suitable location configured for storing data structures.

In an exemplary embodiment, data structures, such as data tables 408, are constructed using erase block index information stored in the final page of each erase block 312. Data tables 408 are constructed when solid state drive 102 is powered on. In another exemplary embodiment, data tables 408 are constructed using the metadata associated with each page 314 in flash chip array 110. Again, data tables 408 are constructed when solid state drive 102 is powered on. Data tables 408 may be constructed, updated, modified, and/or revised at any appropriate time to enable operation of solid state drive 102.

Figure 5:
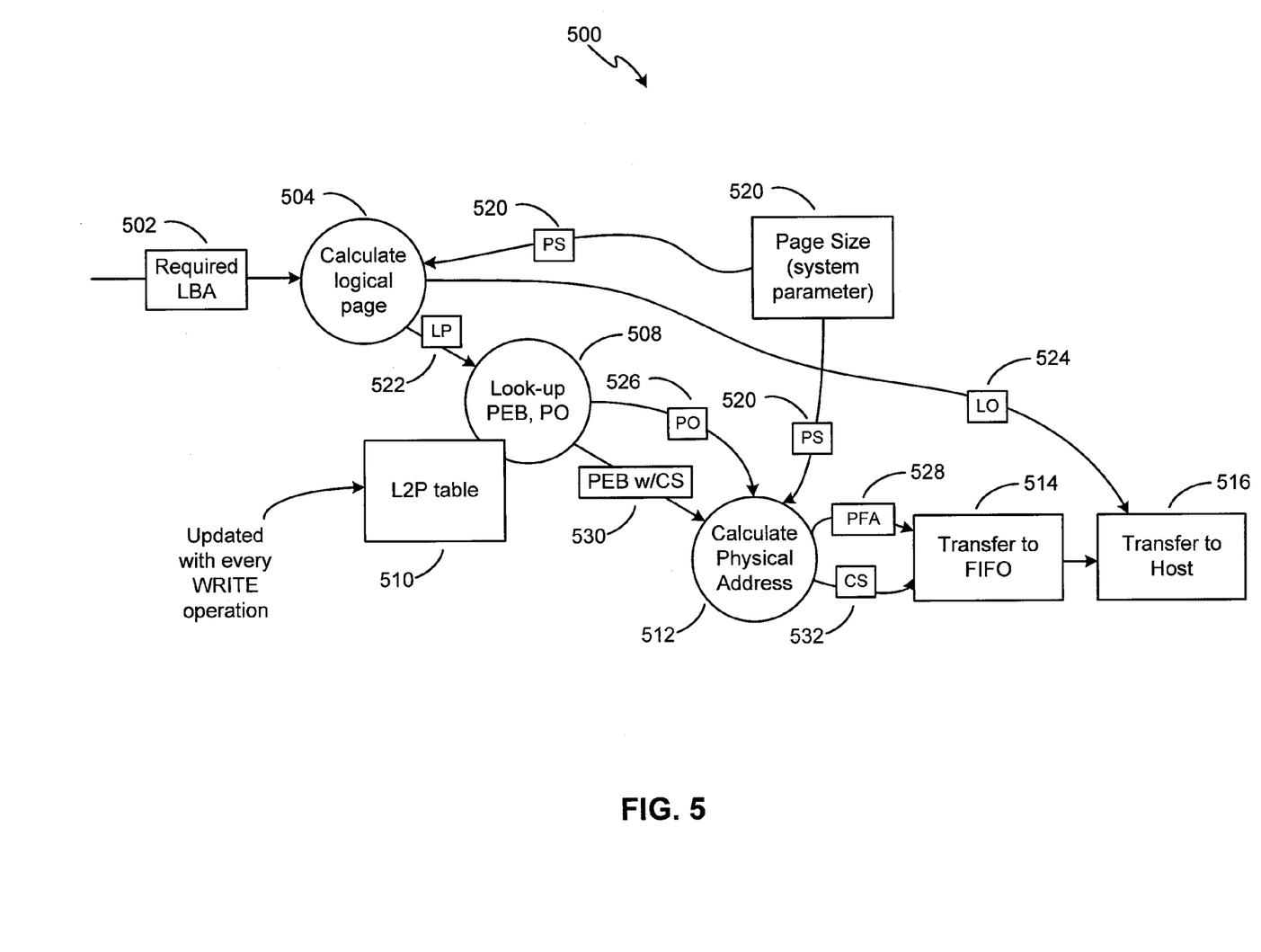
FIG. 5 shows a flowchart for a read operation in accordance with an exemplary embodiment of the invention.

Turning now to FIG. 5, in an exemplary embodiment, the contents of a desired logical page 314 may be retrieved from solid state drive 102 and delivered to host computer 108.

The required logical block address (LBA) 502 of a desired logical page 314 is used together with the page size (PS) 520 to calculate a logical page number (LP) 522. LP 522 is determined by dividing LBA 502 by PS 520. The LBA offset (LO) 524 is a value equal to LBA 502 mod PS 520. Once the logical page number 522 has been obtained, the entry in the L2P table 510 corresponding to L2P[LP] is retrieved. If valid, the entry is divided into portions identifying the physical erase block (PEB) and chip select (CS) portion 530, and the page offset (PO) portion 526. In contrast, if the corresponding table entry in L2P table 404 shows that this is an invalid address, the read operation will return blank data to host computer 108. Further, if the corresponding table entry in L2P table 404 does not have an entry for LP 522 (i.e., an out of bounds request), an appropriate error response is returned to host computer 108.

In an exemplary embodiment, once the physical address of target page 314 is obtained, the data held in target page 314 is retrieved from target page 314, transferred to local buffer 514, and returned to host computer 108. As the data passes through sequence and control machine 210, error correction codes are calculated, and any necessary corrections are made to the data. Media-buffer machine 204 may use advanced features of flash chips 106 to accelerate the data transfer. For example, Intel SD58 series flash chips feature both multiplane and cached operations. These features can reduce the time required for retrieval of more than one page from flash chips 106 compared to retrieving more than one page using the baseline command option.

Figure 6A:
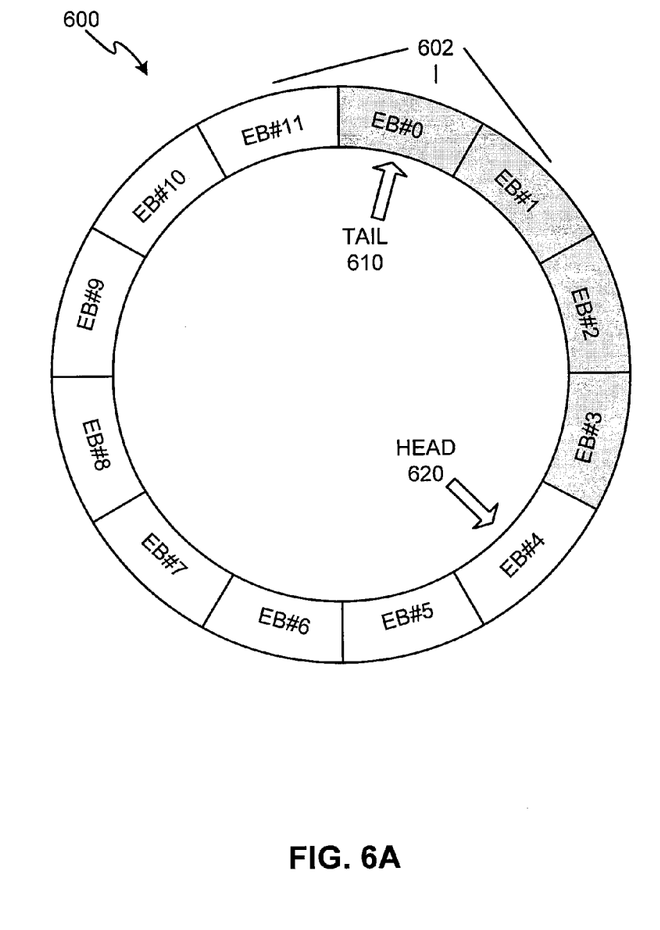
FIG. 6A, FIG. 6B, FIG. 6C, and FIG. 6D illustrate circular storage concepts in accordance with an exemplary embodiment of the invention.
Figure 7:
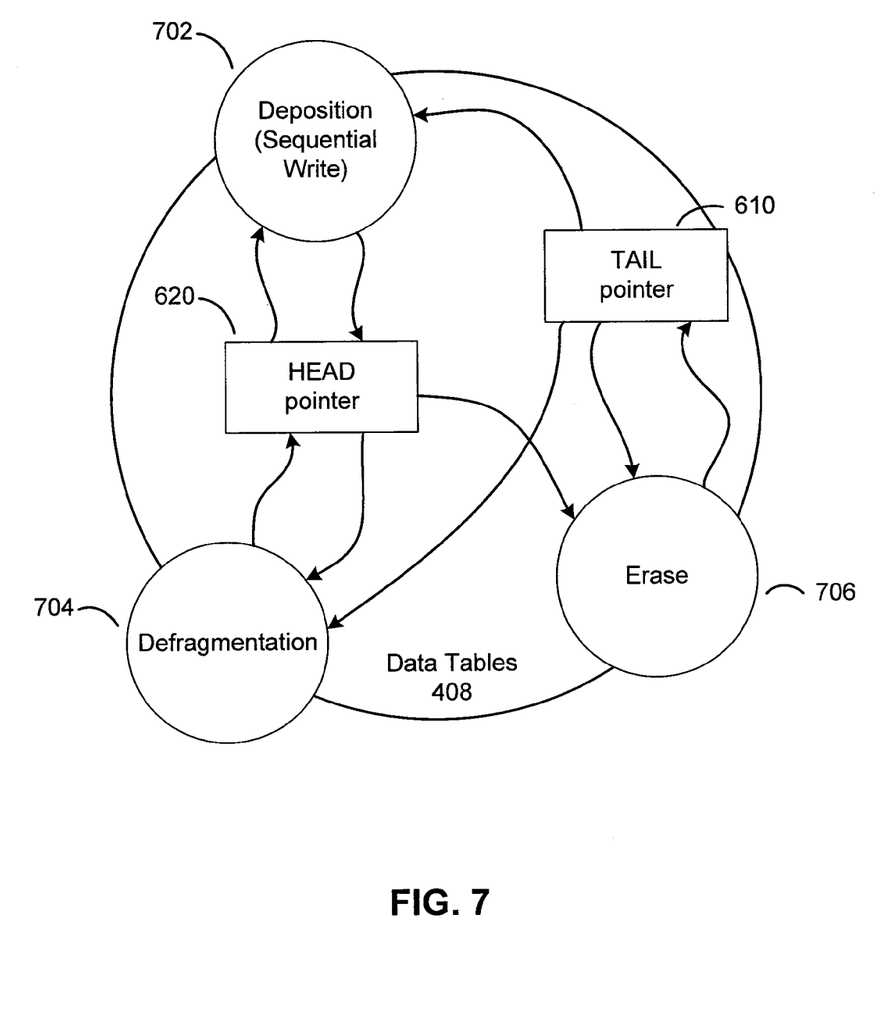
FIG. 7 shows system tasks in accordance with an exemplary embodiment of the invention.

With reference to FIG. 6A and FIG. 7, in accordance with an exemplary embodiment, system tasks such as deposition task 702, defragmentation task 704, and erase task 706 interact with data tables 408, head pointer 620, and tail pointer 610. As illustrated by the arrows, deposition task 702 takes tail pointer 610 and head pointer 620 as input, writes incoming payload data, and returns a new value for head pointer 620. Defragmentation task 704 takes tail pointer 610 and head pointer 620 as input, performs defragmentation operations, and returns a new value for head pointer 620. Erase task 706 takes tail pointer 610 and head pointer 620 as input, performs erase operations, and returns a new value for tail pointer 610. System tasks may also access and/or update data tables 408 as necessary.

When the contents of flash memory array 110 are modified, data tables 408 are updated to reflect the revised contents of flash memory array 110. In an exemplary embodiment, data tables 408 are modified at the completion of a system task. In other exemplary embodiments, data tables 408 are modified during the execution of a system task. Data tables 408 may be modified at any suitable time in order to manage payload data stored on flash memory array 110.

Exemplary techniques for sequential writing of payload data are disclosed in co-pending U.S. patent application Ser. No. 12/103,273 filed on Apr. 15, 2008, now U.S. Patent Application Publication No. 2009/0259800 entitled "Flash Management Using Sequential Techniques", the contents of which are hereby incorporated by reference in their entirety.

With reference now to FIG. 6A, in an exemplary embodiment, erase blocks 312, such as erase blocks 602, in a flash chip array 600 may be considered as a circular storage space of erase blocks 602 numbered from 0 to N, without regard to the actual physical structure of flash chip array 600. Flash chip array 600 may contain any number of erase blocks 602. FIG. 6A depicts an example containing twelve erase blocks 602. Erase blocks #0 to #3 contain payload data, represented by the shading of these erase blocks 602. Erase blocks #4 to #11 contain no payload data, and are thus unshaded. Tail pointer 610 identifies the location representing the end of a chain of payload data. Here, tail pointer 610 points to erase block #0. Head pointer 620 identifies the location where the next page of incoming payload data will be written. Here, head pointer 620 points to erase block #4. In this example, erase block #4 is the next available erase block, and thus head pointer 620 represents the head of a chain of payload data.

Figure 6B:
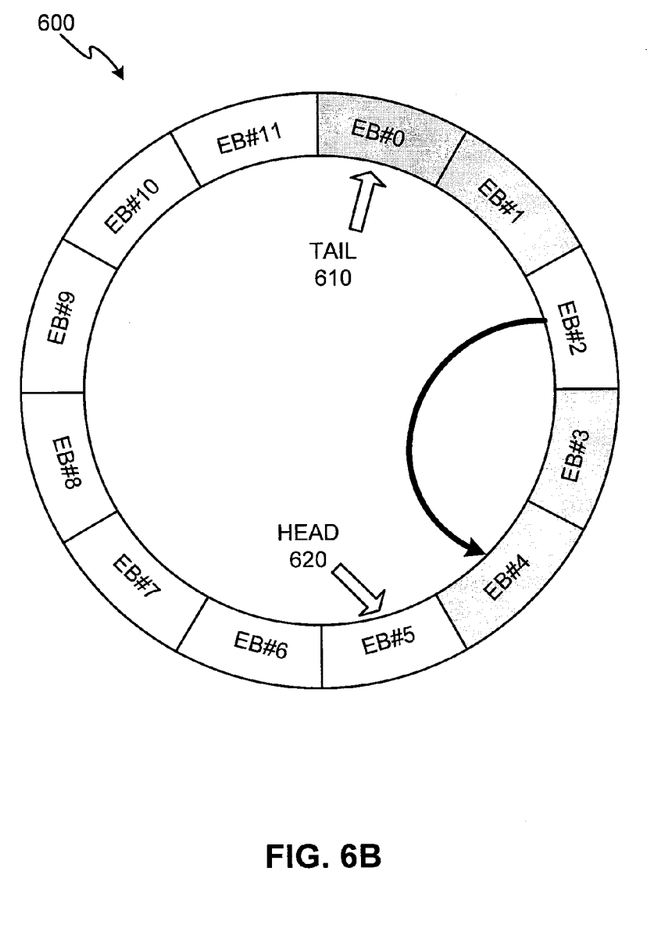

Turning now to FIG. 6B, according to an exemplary embodiment, if host computer 108 requests storage of some logical block addresses more than once, the existing page(s) 314 containing the duplicated data ("containing pages") are marked as obsolete, and the new data is written to the next available erase block 602. In this example, logical block addresses already stored in containing pages 314 inside erase block #2 are requested to be stored again. The containing pages 314 inside erase block #2 are marked as obsolete, and the duplicated data is written to erase block #4. New payload data may also be written to erase block #4 in order to fill the block. If host computer 108 requests duplication of less than a full page of payload data, the existing payload data in containing page 314 is copied forward into the next available erase block 602; otherwise, the existing pages 314 are simply marked as obsolete. Head pointer 620 is advanced to point at erase block #5, now the next available erase block. Erase block #2 is now partially dirty. In this example, all pages 314 in erase block #2 eventually become obsolete, and thus erase block #2 has become a gap in the chain of contiguous erase blocks 602 containing valid payload data.

Figure 6C:
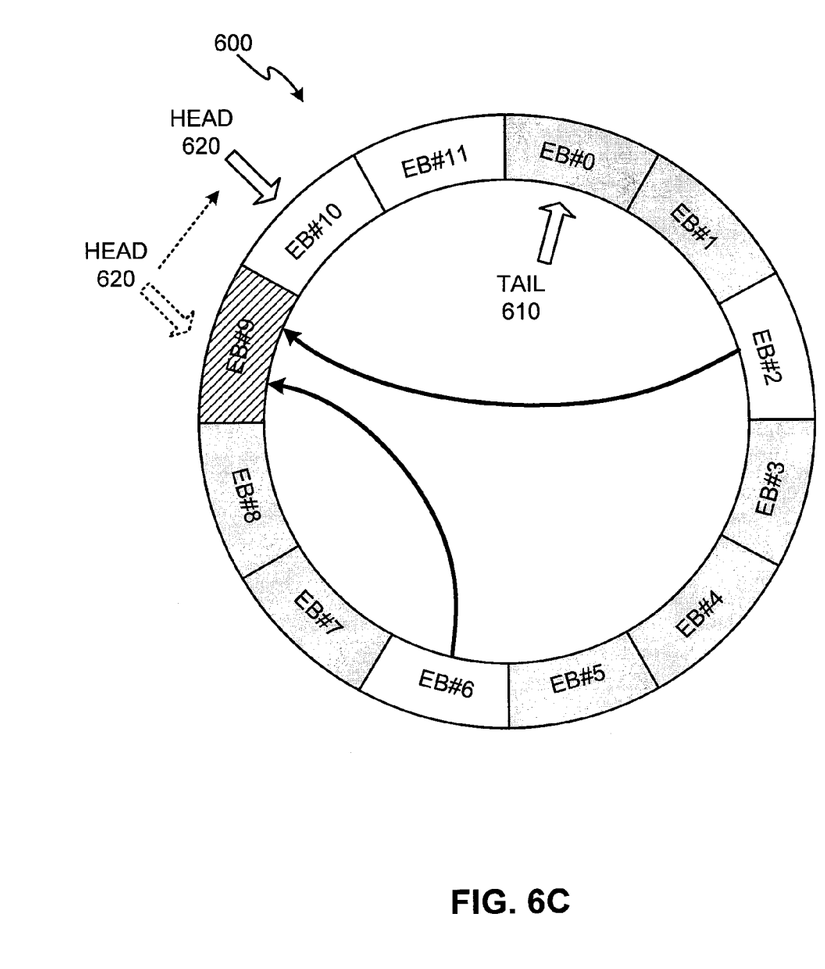

Moving now to FIG. 6C, and in accordance with an exemplary embodiment, at some point many erase blocks 602 in flash memory array 600 contain valid payload data. However, many such erase blocks 602 may be only partially full. Erase blocks 602 which are only partially full may be defragmented by combining two or more partially full erase blocks 602 into a smaller number of more full and/or completely full erase blocks 602. Defragmentation may be performed by defragmentation task 704.

Defragmentation may be performed at any time. In an exemplary embodiment, defragmentation may be performed at a regular interval. In another exemplary embodiment, defragmentation may be performed after a set number of write operations. In other exemplary embodiments, defragmentation may be performed at varying intervals. For example, defragmentation may be performed both to move payload data out of the tail of a payload data chain, and to store data more efficiently. In order to achieve improved short-term burst writing performance, defragmentation may be performed more frequently to move data out of the tail of a payload data chain, and thus create additional space in advance of head pointer 620 and behind tail pointer 610 for writing incoming payload data. In contrast, in order to achieve improved storage efficiency, defragmentation may be performed more frequently on erase blocks 602 located behind head pointer 620 and in front of tail pointer 610.

Continuing to reference FIG. 6B, in accordance with an exemplary embodiment and in this example, payload data contained in two or more partially full erase blocks 602, such as erase block #2 and erase block #6, may be combined, and then stored in the next available erase block 602, which is erase block #9. Head pointer 620 is then advanced to point at the next available erase block 602, which in this example is erase block #10. Erase blocks #2 and erase block #6 are then marked as obsolete.

As can be seen, defragmentation may cause "gaps" in a payload data chain. Proceeding to FIG. 6D, and in accordance with an exemplary embodiment, erase blocks 602 are moved from the tail of the erase block chain to fill the resulting gaps. In this example, the contents of erase block #0 are copied into erase block #6, and the contents of erase block #1 are copied into erase block #2. Erase blocks #0 and #1 are then marked as obsolete. Tail pointer 610 is updated to point at erase block #2, which becomes the new tail of the chain of payload data.

Figure 6D:
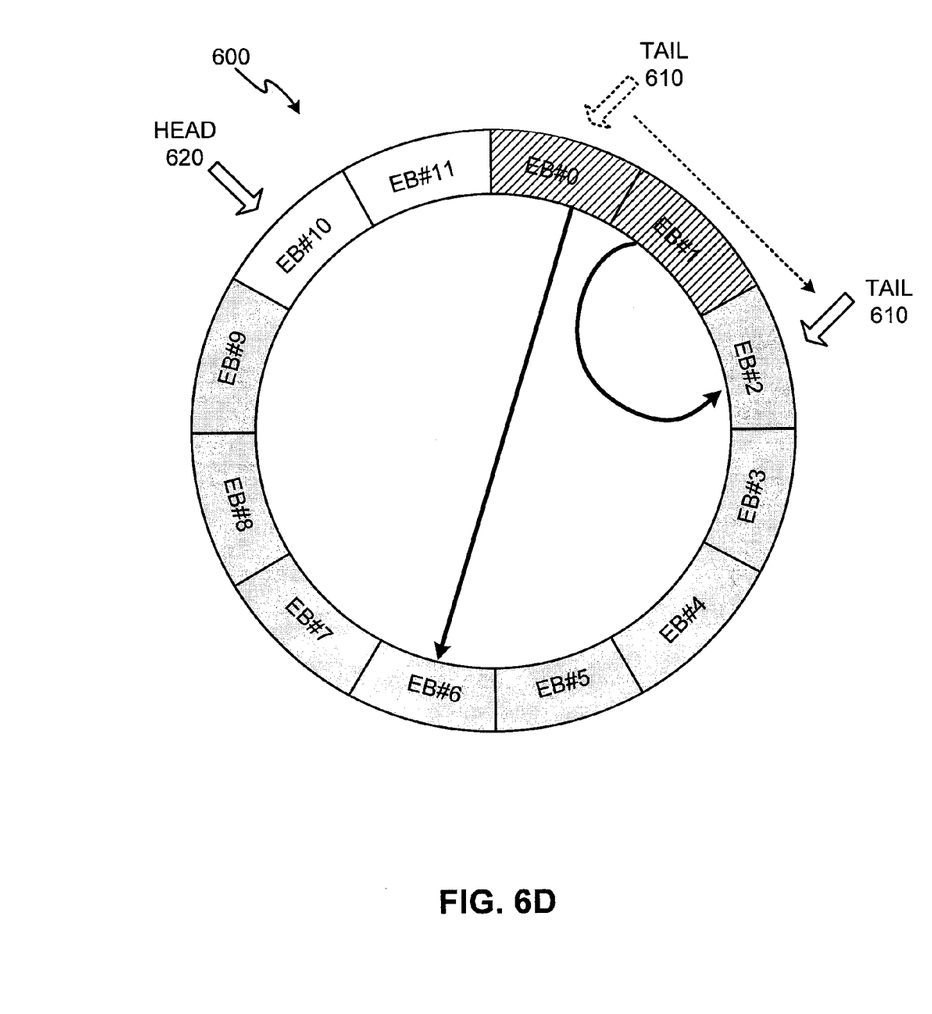

In accordance with various exemplary embodiments, payload data may not be kept in a perfectly contiguous chain in the area behind head pointer 620 and ahead of tail pointer 610 (the "payload area"). Rather, payload data may be stored in a substantially contiguous manner in the payload area at any given moment. Further, payload data may be stored in any suitable manner within the payload area. Erase blocks 602 in the payload area may be in one of several states, including but not limited to: completely full, partially full, partially obsolete, fully obsolete (ready for erasing), erasing, or erased.

Further, in accordance with an exemplary embodiment, a circular writing approach and associated benefits may be realized by providing multiple chains of payload data and maintaining each chain of payload data in a circular manner as described herein.

In accordance with an exemplary embodiment, the portion of erase blocks 602 on solid state drive 102 located behind tail pointer 610 and ahead of head pointer 620 is known as the antipayload area. In like manner, the portion of erase blocks 602 on solid state drive 102 located ahead of tail pointer 610 and behind head pointer 620 is known as the payload area. The antipayload area contains no valid payload data, and is homogenously erased. As incoming payload data is written to erase blocks 602 located at head pointer 620, the antipayload area becomes smaller. As tail pointer 610 moves in response to defragmentation task 704 or erase task 706, the antipayload area becomes larger. Management of the antipayload area can offer improved performance by flash memory management system 100.

In accordance with an exemplary embodiment, management of the antipayload area is performed in connection with two threshold values. A first threshold defines the minimum number of erase blocks 602 in the antipayload area (the "antipayload size"). If the antipayload size falls below this first threshold value, write requests from host computer 108 are paused until defragmentation task 704 and/or erase task 706 increase the size of the antipayload area to exceed this first threshold value. This also indirectly establishes the maximum degree of fragmentation allowed in the payload area. In an exemplary embodiment, the antipayload size is greater than the anticipated number of unusable erase blocks expected to be present during the operational lifetime of solid state drive 102. Further, the antipayload size may be any suitable size configured to achieve desired performance characteristics and/or behavior of solid state drive 102.

In accordance with an exemplary embodiment, a second threshold value defines a number of erase blocks 602 in the antipayload area such that there is no need to activate defragmentation task 704 or other garbage collection actions (the "no-defragmentation size"). If the size of the antipayload area exceeds the no-defragmentation size, write requests from host computer 108 are processed immediately. The no-defragmentation size may be any suitable size configured to achieve the desired behavior and/or performance characteristics or solid state drive 102. Further, this second threshold value may allow for hysteresis in defragmentation operations, such that once a defragmentation operation begins, the operation will continue for at least a predefined period of time. Similarly, once a defragmentation operation completes, a predetermined number of write requests from host computer 108 may be completed before a new defragmentation operation is allowed to begin.

In accordance with an exemplary embodiment, the storage capacity of solid state drive 102 reported to host computer 108 is the size of the payload area, when the size of the antipayload area is equal to or larger than the no-defragmentation size. Stated another way, the storage capacity of solid state drive 102 reported to host computer 108 may be smaller than the payload area when the size of the antipayload area is smaller than the no-defragmentation size. Such a reduction in reported capacity can allow solid state drive 102 to reserve additional space for defragmentation operations or to compensate for the presence of erase blocks which have become unusable during the operational lifetime of solid state drive 102. In other exemplary embodiments, the reported storage capacity of solid state drive 102 may be any appropriate size configured to enable desired operations on solid state drive 102. In this manner, solid state drive 102 may reserve space to be used for such tasks as high-speed bursts of writing without performing a defragmentation operation.

Returning to FIG. 6B and FIG. 7, and in accordance with an exemplary embodiment, erase task 706 erases obsolete erase blocks 602. After an obsolete erase block 602 has been erased, at least three situations may occur.

In the first case, recently erased erase block 602 is pointed to by tail pointer 610 (i.e., this erase block 602 is located at the end of a chain of valid payload data). In this case, this erase block 602 is returned to the antipayload area.

In the second case, recently erased erase block 602 is not pointed to by tail pointer 610. Here, this erase block 602 is now a gap in the chain of payload data. This erase block 602 is placed on a list of "erased" erase blocks 602. Thus, when tail pointer 610 does move, a flash memory management system can easily identify previously erased erase blocks 602 and move tail pointer 610 to a correct location. Further, this recently erased erase block 602 has only a transitory presence on the erased erase blocks list. A defragmentation task will seek out these erased erase blocks 602 in order to move tail pointer 610 as needed. As defragmentation task 704 and erase task 706 interact via the erased erase blocks list, the number of erase blocks 602 in the antipayload area tends to become larger, and both the payload area and antipayload area move in a circular manner across solid state disk 102.

In the third case, an error may occur when erasing an obsolete erase block 602. In this case, an appropriate error message is generated by flash memory management system 100.

While the principles of this disclosure have been shown in various embodiments, many modifications of structure, arrangements, proportions, the elements, materials and components used in practice, which are particularly adapted for a specific environment and operating requirements may be used without departing from the principles and scope of this disclosure. These and other changes or modifications are intended to be included within the scope of the present disclosure and may be expressed in the following claims.

Finally, in the foregoing specification, the invention has been described with reference to various embodiments. However, one of ordinary skill in the art appreciates that various modifications and changes can be made without departing from the scope of the present invention as set forth in the claims below. Accordingly, the specification is to be regarded in an illustrative rather than a restrictive sense, and all such modifications are intended to be included within the scope of the present invention. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for flash memory management, comprising:
providing a head pointer configured to define a first location in a flash memory;
providing a tail pointer configured to define a second location in the flash memory, wherein the head pointer and tail pointer define the beginning and end of a payload data area, respectively;
providing at least one data structure configured to locate payload data written to the flash memory, wherein the at least one data structure is contained entirely in random access memory;
receiving payload data from a host;
writing the payload data to the flash memory in the order the payload data was received from the host;
updating the head pointer and tail pointer such that the payload data area moves in a circular manner within the flash memory; and
providing a second head pointer and second tail pointer such that two payload data areas move in a circular manner within the flash memory.

2. The method of claim 1, wherein the size of the flash memory reported to the host is smaller than the size of the payload area.

3. The method of claim 1, further comprising relocating at least a portion of existing payload data in the payload data area such that existing payload data is stored substantially contiguously in the payload data area.

4. The method of claim 3, wherein relocating existing payload data comprises operations on erase blocks located behind a head pointer and ahead of a tail pointer.

5. The method of claim 3, wherein relocating existing payload data comprises operations on erase blocks located ahead of a head pointer.

6. The method of claim 3, wherein relocating existing payload data comprises merging at least two partially obsolete erase blocks into a single erase block.

7. The method of claim 1, wherein the at least one data structure is constructed using erase block index information stored in the final page of each erase block in the flash memory.

8. The method of claim 1, wherein updating the head pointer and tail pointer causes the flash memory to wear substantially uniformly.

9. A solid state drive, comprising:
a flash memory controller configured to receive payload data from a host;
a random access memory containing at least one data structure, wherein the at least one data structure is configured to locate data written to the solid state drive, and wherein the at least one data structure is contained entirely in the random access memory; and
at least one flash chip configured as a circular storage space, wherein the flash memory controller is configured to write the payload data to the at least one flash chip in the order it was received from the host,
wherein the flash memory controller comprises at least two head pointers such that consecutively received pages of payload data are stored in different erase blocks in the circular storage space.

10. The solid state drive of claim 9, wherein the host interface is at least one of PATA, SATA, SCSI, Fibre Channel, IEEE 1394, and SAS.

11. The solid state drive of claim 9, wherein the flash memory controller comprises software installed on a host computer.

12. The solid state drive of claim 9, further comprising at least one data structure configured to locate payload data written to the at least one flash chip.

13. The solid state drive of claim 12, wherein the at least one data structure is contained entirely in random access memory.

14. A method for flash memory management, comprising:
- providing a head pointer configured to define a first location in a flash memory;
- providing a tail pointer configured to define a second location in the flash memory, wherein the head pointer and tail pointer define the beginning and end of a payload data area, respectively;
- providing at least one data structure configured to locate payload data written to the flash memory, wherein the at least one data structure is contained entirely in random access memory;
- receiving payload data from a host;
- writing the payload data to the flash memory in the order the payload data was received from the host;
- updating the head pointer and tail pointer; and
- pausing a write request from the host when the size of the flash memory behind the tail pointer and ahead of the head pointer falls below a threshold value.

15. A method for flash memory management, comprising:
- providing a head pointer configured to define a first location in a flash memory;
- providing a tail pointer configured to define a second location in the flash memory, wherein the head pointer and tail pointer define the beginning and end of a payload data area, respectively;
- providing at least one data structure configured to locate payload data written to the flash memory, wherein the at least one data structure is contained entirely in random access memory;
- receiving payload data from a host;
- writing the payload data to the flash memory in the order the payload data was received from the host; and
- updating the head pointer and tail pointer;
- wherein the writing the payload data to the flash memory takes place when the size of the antipayload area exceeds the no-defragmentation size.

* * * * *